No. 743,078. PATENTED NOV. 3, 1903.
E. C. HENN.
CLUTCH.
APPLICATION FILED NOV. 24, 1902.
NO MODEL.
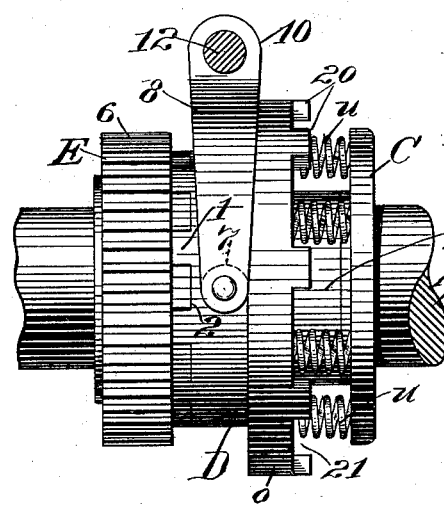
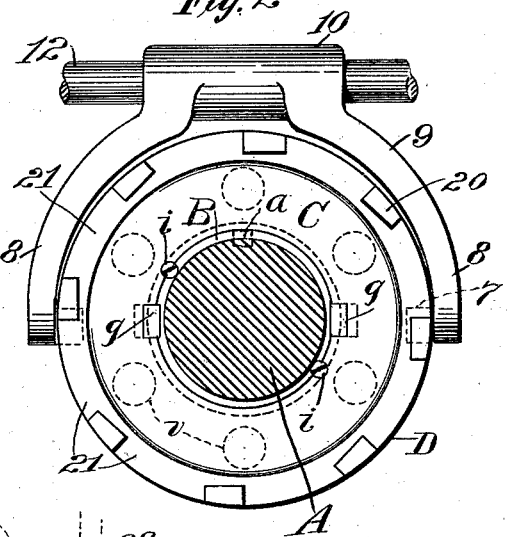
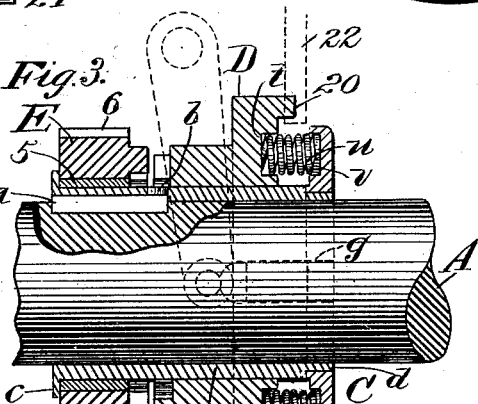
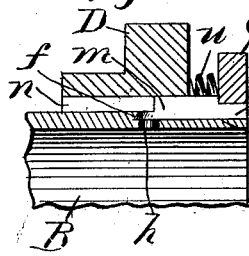
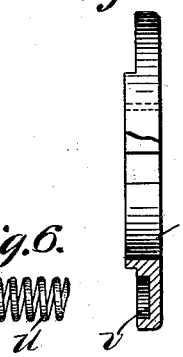
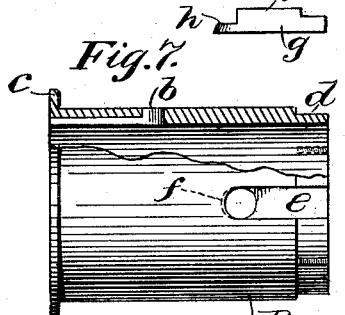
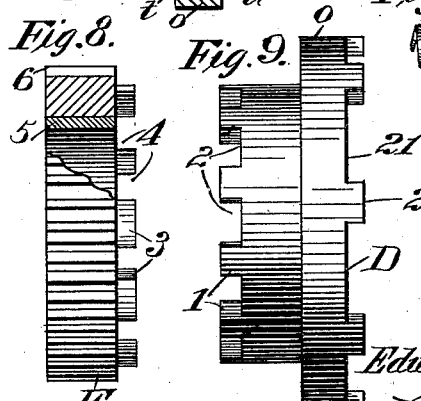
Witnesses:
Herbert J. Smith
E. Everett Ellis
Inventor:
Edwin Charles Henn,
By his Attorney,
F. H. Richards.

No. 743,078. Patented November 3, 1903.

UNITED STATES PATENT OFFICE.

EDWIN CHARLES HENN, OF CLEVELAND, OHIO, ASSIGNOR TO THE NATIONAL-ACME MANUFACTURING COMPANY, OF CLEVELAND, OHIO, A CORPORATION OF OHIO.

CLUTCH.

SPECIFICATION forming part of Letters Patent No. 743,078, dated November 3, 1903.

Application filed November 24, 1902. Serial No. 132,614. (No model.)

*To all whom it may concern:*

Be it known that I, EDWIN CHARLES HENN, a citizen of the United States, residing in Cleveland, in the county of Cuyahoga and State of Ohio, have invented certain new and useful Improvements in Clutches, of which the following is a specification.

This invention relates to clutches; and it consists, substantially, in the improvements hereinafter particularly described.

The invention has reference more especially to clutches of the "longitudinally-movable" class or type; and one of the principal objects of the invention is to provide a clutch of this kind which is positive and both effective and reliable in operation and one also comprising but few parts or elements, which are simple in the construction and organization thereof, besides being adapted for ready application and not liable to get out of order.

A further object of the invention is to provide a clutch of the character referred to which is capable of withstanding great strain and one in which the driven member thereof is quickly responsive to forces tending to move the same into and out of engagement with the driving member.

The invention also has further objects in view, substantially as will hereinafter more fully appear when taken in connection with the accompanying drawings, in which—

Figure 1 is a side view of a clutch constructed and organized in accordance with my invention, the ends of the shaft being broken off and the two members of the clutch being shown in operative engagement. Fig. 2 is an end view of Fig. 1 looking from the right. Fig. 3 is a longitudinal sectional view of the clutch, showing the driven member thereof out of engagement with the driving member, the shaft being shown in part section only and the ends thereof broken off, as in Fig. 1. Figure 4 is a part sectional view of a ring which is rigid with respect to the shaft and forming a bearing or resistance for the springs or other pressure devices employed for normally maintaining the driven member of the clutch in positive operative engagement with the driving member. Fig. 5 is a side view in detail of one of the keys employed between the bearing-ring or resistance and the driven member of the clutch, said key also forming a guide for said member in the longitudinal movements imparted thereto for effecting engagement and disengagement thereof with the driving member. Fig. 6 is a side view in detail of one of the springs or pressure devices employed between the bearing-ring or resistance therefor and the adjacent side of the driven member of the clutch. Fig. 7 is a side view in detail, partly broken out and partly in section, of the sleeve having rigid connection with the shaft and constituting the direct bearing or support for both the driving and driven members of the clutch upon the shaft. Fig. 8 is a side view in detail of the driving member of the clutch, said view being in part section. Fig. 9 is a side view in detail of the driven member of the clutch, and Fig. 10 is a longitudinal sectional view in detail showing more clearly the movable connection between the sleeve on the shaft and the driven member of the clutch.

Before proceeding with a more detailed description it may be stated that I employ a suitable shaft, upon which is preferably mounted a sleeve of proper dimensions and having rigid connection with the shaft, so as to revolve therewith, but being incapable of longitudinal movement thereon, said sleeve constituting a direct support for my improved clutch, which comprises in the main a driven member and a driving member, the said first-named member being applied or fitted to the sleeve, so as to revolve therewith, and also having a limited longitudinal movement with respect thereto, and said second-named member being incapable of longitudinal movement with respect to the sleeve, but permitting the latter (together with the driven member and the shaft) to remain stationary at such times as the two members of the clutch may not be in operative engagement with each other. The driving and driven members of the clutch are each of special construction, and the general organization of parts or elements employed are such as to furnish the best or most economical results in practice. It will be understood, however, that I am not limited to the precise embodiment herein shown, since changes therein may be made without departure from the spirit or scope of my invention.

Specific reference being had to the drawings by the designating characters marked thereon, A represents a portion of an ordinary shaft, upon which is placed a sleeve B, the two being held in rigid relationship in any suitable manner, as by means of a key or spline $a$, entering corresponding ways formed in the adjacent surfaces thereof, the said sleeve being originally formed with an opening $b$ to facilitate the proper machining of the way therein and also having at one end a flange or head $c$, the other end thereof being reduced in external diameter for a suitable distance, as shown at $d$. From this latter end the said sleeve is formed for a suitable distance at preferably diametrically opposite sides thereof with keyways $e$, each of which is preferably undercut at the inner end thereof at $f$ and in each of which is fitted or inserted a key $g$, the inner end of which is beveled at $h$ to fit said undercut, the opposite end of each of said keys extending outwardly to a plane substantially flush or even with the corresponding end of said sleeve and entering corresponding ways therefor, the sides of which lead from the inner edge or surface of a ring C, which is fitted to said end of the sleeve, said ring being further secured to the sleeve by means of screws $i\ i$, entering a threaded half-groove in each from the end, thus preventing endwise displacement of the sleeve, the said screws and key portions which are in engagement with the ring serving not only to cause the ring to rotate with the sleeve and shaft, but the said key portions also serving to relieve the screws from any lateral strain resulting from such rotation. Intermediate its ends each of said keys $g$ is raised or elevated from the outer surface thereof, forming a guide $m$, which works in or is received between the sides of a longitudinal groove $n$, formed in the inner surface of the driven member D of my improved clutch, said grooves $n$ preferably extending all the way through said member from end to end thereof. (See Fig. 10.) Said driven member D of the clutch is preferably enlarged diametrically at the outer end thereof, as shown at $o$, and at suitable intervals of such outer end pockets $t$ are formed, the inner walls of said pockets serving as bearings for the inner ends of springs or other pressure devices $u$, the outer ends of which bear against the inner walls of corresponding pockets $v$, formed in the inner face of the said ring C, these latter walls serving as abutments or resistances for said springs or pressure devices to act by their tension to normally maintain the said driven member D in operative or working engagement with the driving member E of the clutch. Such operative or working engagement of the two members of the clutch could in some instances be derived from frictional contact of the adjacent faces of the two said members; but I prefer that the engagement be positive in character, for which purpose I construct the inner face of the driven member at predetermined intervals thereof with lateral projections or teeth 1, forming intermediate pockets or spaces 2, in which are snugly received corresponding lateral projections or teeth 3 on the inner face of the driving member E, said projections or teeth 3 forming similar pockets or spaces 4, in which are also snugly received the said projections or teeth 1 on the driven member D, a normal interlocking engagement between the two said members being thus effected. The inner surface of the said driving member E of the clutch is preferably provided with a brass or bushing 5, and the outer surface thereof is preferably shown as provided all around with teeth 6 for suitable engagement with a driving-wheel or other device, (not shown,) although it is apparent that the same may be formed or adapted on said outer surface for the reception of a band or chain, (also not shown.) As before stated, the said driven member D of the clutch is enlarged at its outer end, and the inner surface of such enlargement $o$ constitutes at opposite points thereof abutments for the sides of friction-rolls 7, carried at the ends of arms 8 of a bifurcated yoke 9, which is formed with a sleeve 10 and hung from a rock-shaft 12, supported in any suitable manner above the clutch, said arms being normally maintained in substantially vertical positions relative to the clutch, as shown, due to the constant inward pressure exerted upon the driven member of the clutch by the springs or other pressure devices already referred to. To disengage the clutch members, the said rock-shaft may be operated upon in proper directions by means of a cam (not shown) or in any other suitable way to move the driven member D outwardly against the force of the springs or pressure devices, and during such intervals the said driven member will come to a stop with the shaft and sleeve thereon, while the driving member E will continue to rotate alone until again engaged in the manner already described by reverse movement communicated to the arms of the yoke from the said rock-shaft. It is apparent, of course, that various other means may be employed for moving one member of the clutch out of engagement with the other and that any suitable means may be provided to prevent inward longitudinal movement of the driving member upon the sleeve, such movement being prevented in an outward direction by the flange $c$ or similar means at the end of the sleeve. In several of the figures of drawings the said enlargement $o$ at the outer end of the driven member D is formed on the outer surface, at the periphery thereof, with lateral projections or teeth 20, forming intermediate pockets or spaces 21, the said construction being for the purpose of adapting my improved clutch to a particular use in certain kinds of machinery—as, for instance, screw-machines—the said teeth or projections being engaged by a projection 22 from the casing of the machine, which is employed to engage such teeth or projections 20 when the clutch is not engaged.

It will be observed that the clutch mechanism comprises a sleeve B, having at each end a head, as c and C, and the following members mounted upon said sleeve between said heads—namely, a power-transmitting wheel E, provided with one set of clutching-teeth 3, and a splined collar D, provided with the other set of clutching-teeth; that a symmetrically-disposed series of compression-springs u is disposed between one of said heads C and the clutch member D; that the flange o of the collar D is adapted to serve as a bearing for a clutch-shifting lever, such as 9, said flange being also provided with seats t for said springs and the head C having corresponding seats v; that the projections 20 upon the collar-flange are adapted to engage with a projection 22 upon the casing or framework of the machine, so that when the collar is moved out of clutching position it slides into engagement with said framework projection, whereby the collar, and hence the shaft, is prevented from rotation, which is a feature of importance in screw-making and other machines in which in many instances it is necessary to perform a great diversity of successive operations upon the stock, some of which may require the spindle to revolve and others of which may require the same to be held stationary. It will be seen that the stop-engaging means 20 project in a direction opposite or away from the clutching member E, so that by the movement of the splined collar D away from said clutching member E said stop-engaging means 20 may be brought into use—that is, may be caused to engage the framework projection 22—and by movement in an opposite direction may be withdrawn from said projection or stop. It will thus be seen that the collar D has oppositely-projecting sets of teeth, one set, 1, for coacting with the clutching member E and the other set, 20, for locking said collar against rotation, this set being rendered effective by the unclutching movement of the shifter for locking the collar against rotation.

Having thus described my invention, I claim—

1. The combination with a shaft of a clutch mechanism comprising a sleeve upon the shaft and having at each end a head, and the following members mounted upon said sleeve and confined between said heads, namely, a power-transmitting wheel provided with one member of a clutch, and a collar provided with the other member of the clutch; one of said collar and wheel elements being splined to said sleeve.

2. The combination with a shaft of a clutch mechanism comprising a sleeve upon the shaft and having at each end a head, and the following members mounted upon said sleeve and confined between said heads, namely, a power-transmitting wheel provided with one member of a clutch, a sliding collar splined to the sleeve and provided with the other member of the clutch, and a spring between one of said heads and said collar.

3. The combination with a shaft of a clutch mechanism comprising a sleeve upon the shaft and having a head, a power-transmitting wheel mounted upon said sleeve and capable of rotation independently of said sleeve, a clutching device upon said wheel, a sliding collar splined upon said sleeve between said wheel and said head, and having a corresponding clutching device, and a plurality of compression-springs between said head and said sliding collar.

4. The combination with a shaft of a clutch mechanism comprising a sleeve upon the shaft and having at each end a head, a power-transmitting wheel mounted upon said sleeve between said heads, a clutching device upon said wheel, a collar mounted upon said sleeve, and having a corresponding clutching device, one of said collar and wheel elements being splined to said sleeve and the other being rotatable relatively to said sleeve, and a plurality of compression-springs between one of said heads and said splined element.

5. The combination with a shaft of a clutch mechanism comprising a sleeve upon the shaft and having at each end a head, a power-transmitting wheel mounted upon said sleeve between said heads and capable of rotation independently of said sleeve, a clutching device upon said wheel, a sliding collar splined upon said sleeve between said wheel and the other of said heads, and having a corresponding clutching device, and a plurality of compression-springs between the last-mentioned head and said sliding collar, the latter having a flange adapted to serve as a bearing for a clutch-shifting lever.

6. The combination with a shaft of a clutch mechanism comprising a sleeve upon the shaft and having loosely mounted thereon a power-transmitting wheel which is provided with a clutching portion, a sliding collar splined to said sleeve and having at one end a corresponding clutching portion and at the other end a flange which is adapted to serve as a bearing for a clutch-shifting lever, a head upon said sleeve adjacent to said flange, and a plurality of compression-springs working between said head and said flange.

7. The combination with a shaft of a clutch mechanism comprising a sleeve upon the shaft and having loosely mounted thereon a power-transmitting wheel which is provided with a clutching portion, a sliding collar splined to said sleeve and having at one end corresponding clutching portions and at the other end a flange for coaction with a shifting lever, a head upon said sleeve adjacent to said flange, a plurality of symmetrically-disposed seats in said flange, a corresponding series of seats in said head, and a plurality of compression-springs bearing in said seats.

8. A clutch mechanism comprising a fixed stop, two revoluble clutching members, whereof one may move longitudinally, and means upon said longitudinally-movable member adapted to engage with said fixed stop; said stop-engaging means projecting in a direction away from the other clutching member, so that by movement of said longitudinally-movable member away from the other clutching member, said stop-engaging means may be brought into use, and by movement in an opposite direction may be withdrawn from use.

9. A clutch mechanism comprising two revoluble clutching members, whereof one may move longitudinally, a stationary stop, and means upon said longitudinally-movable member rendered effective by the movement of the latter out of engagement with the other clutch member, for engaging said stop.

10. A clutch mechanism comprising two revoluble clutching members, whereof one has oppositely-projecting sets of teeth, the teeth in one of said sets being adapted to coact with the other of said clutching members, and the teeth in the other of said sets being adapted for locking against rotation when said members are unclutched, and a fixed stop for cooperation with the last-mentioned teeth.

11. The combination with two revoluble members having clutching means, of a clutch-shifter, and means rendered effective by the unclutching movement of said shifter for locking one of said clutching members against rotation.

12. A clutch mechanism comprising a sleeve, and the following members mounted upon said sleeve, namely, a power-transmitting wheel provided with one member of a clutch, and a splined collar provided with the other member of the clutch; in combination with means for locking said collar against rotation when unclutched.

13. A clutch mechanism comprising a sleeve having a head, of the following members mounted upon said sleeve, namely, a power-transmitting wheel provided with one member of a clutch, a collar provided with the other member of the clutch, one of said wheel and collar elements being splined to said sleeve, and a spring between said head and the splined element, in combination with a fixed projection for cooperation with the splined element to hold the same against rotation when unclutched.

14. A clutch mechanism comprising a sleeve having at each end a head, a power-transmitting wheel mounted upon said sleeve between said heads and capable of rotation independently of said sleeve, clutching devices upon said wheel, a splined collar upon said sleeve between said wheel and the other of said heads, and having corresponding clutching devices, a series of compression-springs between the last-mentioned head and said collar, a plurality of stops upon said collar, and a projection for engaging said stops when the collar is unclutched from the wheel.

15. A clutch mechanism comprising a sleeve having at each end a head, a power-transmitting wheel mounted upon said sleeve between said heads and capable of rotation independently of said sleeve, a clutching device upon said wheel, a splined collar mounted upon said sleeve between said wheel and the other of said heads, and having a corresponding clutching device, a plurality of compression-springs between the last-mentioned head and said sliding collar, a stop upon said collar, and a stationary projection for engaging said stop.

EDWIN CHARLES HENN.

Witnesses:
FRED. J. DOLE,
E. EVERETT ELLIS.